(12) United States Patent
Biadglin et al.

(10) Patent No.: US 11,067,914 B2
(45) Date of Patent: Jul. 20, 2021

(54) LIQUID ELECTROPHOTOGRAPHIC INK(S)

(71) Applicant: HP INDIGO B.V., Amstelveen (NL)

(72) Inventors: Getahun Biadglin, Nes Ziona (IL); Emad Masoud, Nes Ziona (IL); Reut Avigdor, Nes Ziona (IL); Albert Teishev, Nes Ziona (IL); Tehila Ben-Ezra, Nes Ziona (IL); Igor Shutyi, Nes Ziona (IL); Hanit Marom Tchaicheeyan, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/469,875

(22) PCT Filed: Mar. 17, 2017

(86) PCT No.: PCT/EP2017/056440
§ 371 (c)(1),
(2) Date: Jun. 14, 2019

(87) PCT Pub. No.: WO2018/166629
PCT Pub. Date: Sep. 20, 2018

(65) Prior Publication Data
US 2020/0081363 A1  Mar. 12, 2020

(51) Int. Cl.
| | | |
|---|---|---|
| *G03G 9/13* | (2006.01) | |
| *G03G 9/135* | (2006.01) | |
| *G03G 9/125* | (2006.01) | |
| *G03G 9/12* | (2006.01) | |

(52) U.S. Cl.
CPC ............ *G03G 9/125* (2013.01); *G03G 9/122* (2013.01); *G03G 9/131* (2013.01); *G03G 9/132* (2013.01)

(58) Field of Classification Search
CPC ......... G03G 9/131; G03G 9/132; G03G 9/135
See application file for complete search history.

(56) References Cited

U.S. PATENT DOCUMENTS

| | | | | |
|---|---|---|---|---|
| 6,096,797 A | * | 8/2000 | Prantl | C09D 11/101 522/174 |
| 7,654,660 B2 | | 2/2010 | Hale et al. | |
| 8,337,006 B2 | | 12/2012 | Hale et al. | |
| 9,025,990 B2 | | 5/2015 | Schlumm et al. | |
| 2007/0105034 A1 | * | 5/2007 | Chatow | G03G 9/12 430/114 |
| 2009/0017299 A1 | | 1/2009 | Shimbo et al. | |
| 2013/0288172 A1 | | 10/2013 | Everhardus et al. | |
| 2015/0306866 A1 | | 10/2015 | Gila et al. | |

FOREIGN PATENT DOCUMENTS

| | | |
|---|---|---|
| JP | 2004294468 | 10/2004 |
| WO | 2005054959 | 6/2005 |
| WO | 2013159820 | 10/2013 |
| WO | 2016116142 | 7/2016 |

OTHER PUBLICATIONS

A. F. McKay, E. J. Tarlton, and C. Podesva, "Novel Condensation of Cyclohexanone with Urea". J. Org. Chem. 1961, 26, 1, 76-79. (Year: 1961).*
"Aldehydes" Gold Book: IUPAC Compendium of Chemical Terminology (1 page) . (Year: 2014).*
International Search Report for PCT/EP2017/056440 filed Mar. 17, 2017, Applicant Hewlett-Packard Indigo B.V.

* cited by examiner

*Primary Examiner* — Christopher D Rodee
(74) *Attorney, Agent, or Firm* — Thorpe North & Western LLP

(57) ABSTRACT

The present disclosure discloses a liquid electrophotographic ink. The ink can include (A) a liquid vehicle; (B) at least one colorant; (C) a resin comprising an ethylene acid copolymer; (D) an ethylene/(meth)acrylic acid C1-10 alkyl ester copolymer selected from the group consisting of an ethylene/methyl acrylate copolymer and an ethylene/butyl acrylate copolymer; and (E) a condensation product of urea and aldehyde.

20 Claims, 4 Drawing Sheets

LIQUID ELECTROPHOTOGRAPHIC INK(S)

BACKGROUND

In electrophotographic printing systems, a hardcopy of an image can be developed by using a photoconductive surface. The photoconductive surface can be on a cylinder and is often termed a photo imaging plate (PIP). The photoconductive surface can be selectively charged with a latent electrophotographic image having image and background areas with different potentials.

For example, a liquid electrophotographic ink composition can be brought into contact with the selectively charged photoconductive surface forming a latent image. The liquid electrophotographic ink particles can be charged and can adhere to the image areas of the latent image while the background areas remain clean. The image can then be transferred to a print substrate (e.g., paper) directly or, more commonly, by being first transferred to an intermediate transfer member, which can be a soft swelling blanket, and then to the print substrate. Variations of this method utilize different ways for forming the electrophotographic latent image on a photoreceptor or on a dielectric material. The image transferred on to a substrate (e.g., paper) should have sufficient adhesion to the substrate for good print quality and printing efficiency.

BRIEF DESCRIPTION OF THE DRAWINGS

Examples will now be described, by way of non-limiting examples, with reference to the accompanying drawings, in which.

DETAILED DESCRIPTION

Figure 1C:
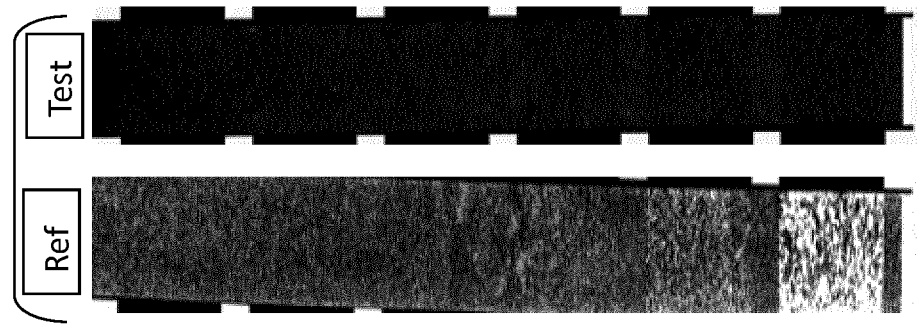
FIGS. 1(a), 1(b), and 1(c) show scanned images of printed images after peeling comparing a liquid electrophotographic ink composition described herein with a reference ink on Substrate 1—UPM Finesse (FIG. 1(a)), Substrate 2—Soporset™ (FIG. 1(b)), and Substrate 3—Anthem Plus® (FIG. 1(c))

It is to be understood that this disclosure is not limited to the particular process steps and materials disclosed herein because such process steps and materials may vary somewhat. It is also to be understood that the terminology used herein is used for describing particular examples. The terms are not intended to be limiting because the scope of the present disclosure is intended to be limited by the appended claims and equivalents thereof.

It is noted that, as used in this specification and the appended claims, the singular forms "a," "an," and "the" include plural referents unless the context clearly dictates otherwise.

As used herein, "carrier fluid," "carrier liquid," or "liquid vehicle" refers to the fluid in which the pigmented resin material of the present disclosure can be dispersed to form an ink dispersion. Such a liquid vehicle can be formulated for electrophotographic printing so that the electrophotographic ink has a viscosity and conductivity for such printing, and may include a mixture of a variety of different agents, including without limitation, surfactants, organic solvents and co-solvents, charge control agents, viscosity modifiers, sequestering agents, stabilizing agents, and anti-kogation agents. Though not part of the electrophotographic liquid vehicle per se, in addition to the pigment and resin, the liquid vehicle can further carry solid additives such as resins, latexes, UV curable materials, plasticizers, salts, charge control agents, or mixtures thereof.

As used herein, "co-solvent" refers to any solvent, including organic solvents, present in the electrophotographic liquid vehicle.

As used herein, "pigment" generally includes pigment colorants, magnetic particles, aluminas, silicas, and/or other ceramics, organometallics or other opaque particles, whether or not such particulates impart color. Thus, though the present description exemplifies the use of pigment colorants, the term "pigment" can be used more generally to describe not only pigment colorants, but other pigments such as organometallics, ferrites, ceramics, or mixtures thereof. In one specific example, however, the pigment is a pigment colorant.

As used herein, "ethylene acrylic acid copolymer resin" generally refers to both ethylene acrylic acid copolymer resins and ethylene methacrylic acid copolymer resins, unless the context dictates otherwise.

As used herein, "substituted" means that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, or combinations thereof.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same applies to ranges reciting one numerical value. Furthermore, such an interpretation should apply regardless of the breadth of the range or the characteristics being described.

In the present description and unless otherwise indicated, "electrophotographic printing" or "electrostatic printing" refers to the process that provides an image that is transferred from a photo imaging substrate either directly or indirectly via an intermediate transfer member. As such, the image is not substantially absorbed into the photo imaging substrate on which it is applied. Additionally, "electrophotographic printers" or "electrostatic printers" refer to those printers capable of performing electrophotographic printing, as described above. "Liquid electrophotographic printing" or "liquid electrostatic printing" is a specific type of electrophotographic printing where a liquid ink is employed in the electrophotographic process rather than a powder toner.

As used herein, liquid electrophotographic ink is synonymous with liquid electrophotographic inks, liquid electrophotographic ink composition, liquid electrophotographic compositions, LEP, LEPs, LEP ink, LEP inks, LEP ink composition, LEP ink compositions, or other variations of the foregoing phraseology. Further, as used herein, "electrostatic" and "electrophotographic" are used synonymously.

In the present description and unless otherwise indicated, $D_{50}$ (aka $d_{50}$) diameter is used to define the liquid electrophotographic ink particle size and size distribution, is expressed in microns and refers to the size in microns that splits the distribution with half above and half below this diameter.

It has been recognized that a liquid electrophotographic ink having pigment(s), resin(s), and a liquid vehicle should provide excellent printed image adhesion to different substrates in order to improve print quality and printing efficiency.

There is, therefore, a need for liquid electrophotographic ink(s) that can provide excellent image adhesion.

The liquid electrophotographic inks described herein can include a condensation product of the urea and aldehyde. When compared with liquid electrophotographic inks without the condensation product of the urea and aldehyde, the liquid electrophotographic inks containing the condensation product of urea and aldehyde can result in a significant improvement in liquid electrophotographic ink adhesion to a variety of substrates.

Without wishing to be bound by theory, it is believed that the addition of the condensation product of aldehyde and urea to liquid electrophotographic inks can introduce a high concentration of polar groups that can enhance hydrogen bonds, Van der Waals forces, and dipole-dipole interactions between the liquid electrophotographic ink and the substrate. These bonds, forces, and/or interactions are believed to allow the liquid electrophotographic ink to adhere more effectively to the substrates when compared with liquid electrophotographic inks that do not have condensation products of urea and aldehyde.

Liquid Electrophotographic Ink(s)

In one example, the present disclosure describes a liquid electrophotographic (LEP) ink including:
(A) a liquid vehicle;
(B) at least one colorant;
(C) a resin comprising an ethylene acid copolymer;
(D) an ethylene/(meth)acrylic acid $C_{1-10}$ alkyl ester copolymer selected from the group consisting of an ethylene/methyl acrylate copolymer and an ethylene/butyl acrylate copolymer; and
(E) a condensation product of urea and aldehyde.

In some examples, component (B) at least one colorant may not be added.

In some examples, the LEP ink can have a viscosity of less than 50 cps, in some examples less than about 20 cps, and in yet other examples between about 2 and about 10 cps, when measured at a temperature of about 25° C., a shear rate of about 11 Hz and at an LEP ink solids content between about 5% and about 30% by weight over the weight of the LEP ink. An example of an apparatus to measure viscosity is a commercially available AR-2000 rheometer from Thermal Analysis Instruments. The viscosity can be measured in parallel plates mode, using spindle of 40 mm diameter and 500 micrometers gap adopting the temperature, shear rate and LEP ink solids conditions as above.

In some examples, the LEP ink can have a $D_{50}$ diameter between about 0.1 and about 50 microns. In some examples, the LEP ink can have a $D_{50}$ diameter between about 1 and about 10 microns. In some examples, the LEP ink can have a $D_{50}$ diameter between about 1 and about 8 microns.

(A) Liquid Vehicle

The liquid vehicle may act as a dispersing medium for the other components in the LEP ink. For example, the liquid vehicle can include or be a hydrocarbon, silicone oil, vegetable oil, or mixtures thereof. The liquid vehicle can include, but is not limited to, an insulating, non-polar, non-aqueous liquid that can be used as a medium for the LEP ink particles. The liquid vehicle can include compounds that have a resistivity in excess of about $10^9$ ohm-cm. The liquid vehicle may have a dielectric constant below about 5, in some examples below about 3. The liquid vehicle can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof.

Examples of the liquid vehicle can include, but are not limited to, aliphatic hydrocarbons, isoparaffinic compounds, paraffinic compounds, dearomatized hydrocarbon compounds, and the like. In some examples, the liquid vehicle can include, but are not limited to, Isopar-G™, IsoparH™, Isopar-L™, Isopar-M™, Isopar-K™, Isopar-V™, Norpar 12™, Norpar 13™, Norpar 15 ™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™ Nisseki Naphthesol H™, #0 Solvent L™, #0 Solvent M™, #0 Solvent H™ Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

The liquid vehicle can constitute from about 20% to about 99.5% by weight of the LEP ink composition, in some examples from about 50% to about 99.5% by weight of the LEP ink composition. The liquid vehicle may constitute from about 40 to about 90% by weight of the LEP ink composition. The liquid vehicle may constitute from about 60% to about 80% by weight of the LEP ink composition.

The liquid vehicle may constitute from about 90% to about 99.5% by weight of the LEP ink composition, in some examples from about 95% to about 99% by weight of the LEP ink composition.

(B) Colorant(s)

The LEP inks described herein, either before or after having been printed on the print substrate, may further include a colorant. The chargeable particles including the resin may further include the colorant. The colorant may be selected from a pigment, dye and a combination thereof. The colorant may be transparent, unicolor or composed of any combination of available colors. The colorant may be selected from a cyan colorant, a yellow colorant, a magenta colorant and a black colorant. The LEP ink composition and/or LEP ink printed on the print substrate may include a plurality of colorants.

The LEP ink composition and/or LEP ink printed on the plastic substrate may include a first colorant and second colorant, which are different from one another. Further colorants may also be present with the first and second colorants. The LEP ink composition and/or LEP ink printed on the plastic substrate may include first and second colorants where each is independently selected from a cyan colorant, a yellow colorant, a magenta colorant and a black colorant.

In some examples, the first colorant can include a black colorant, and the second colorant can include a non-black colorant, for example a colorant selected from a cyan colorant, a yellow colorant and a magenta colorant. The colorant may be selected from a phthalocyanine colorant, an indigold colorant, an indanthrone colorant, a monoazo colorant, a diazo colorant, inorganic salts and complexes, dioxazine colorant, perylene colorant, anthraquinone colorants, and any combination thereof.

In some examples, the LEP ink composition can include a white colorant. In some examples, the white colorant is selected from $TiO_2$, calcium carbonate, zinc oxide, and mixtures thereof. In some examples, the LEP ink can include a white colorant selected from rutile, anatase, and brookite, and mixtures thereof. In some examples, the LEP ink can include a white colorant in the form of rutile. The rutile form of $TiO_2$ exhibits the highest refractive index among the other forms of $TiO_2$ and the other listed pigments. All other parameters of the LEP inks being the same, the highest refractive index yields the highest opacity.

In some examples, the LEP ink can lack a colorant. In some examples, the LEP ink can lack inorganic particulate material. In some examples, the LEP ink can be substantially transparent when printed.

The colorant may include a pigment. The pigments can be any pigment compatible with the liquid vehicle and useful for electrophotographic printing. For example, the pigment may be present as pigment particles, or may include a resin (in addition to the polymers described herein) and a pigment. The resins and pigments can be any of those commonly used as known in the art. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200.

The colorant may constitute at least about 0.1 wt % of the solids of the LEP ink, in some examples at least about 0.2 wt % of the solids of the LEP ink, in some examples at least about 0.3 wt % of the solids of the LEP ink, in some examples at least about 0.5 wt % of the solids of the LEP ink, in some examples at least about 1 wt % of the solids of the LEP ink.

In some examples the colorant may constitute from about 1 wt % to about 50 wt % of the solids of the LEP ink, in some example from about 5 wt % to about 40 wt % of the solids of the LEP ink, in some examples from about 20 wt % to about 40 wt % of the solids of the LEP ink, in some examples from about 25 wt % to about 35 wt % of the solids of the LEP ink in some examples from about 5 wt % to about 20 wt % of the solids of the LEP ink.

In some examples, the colorant(s) are combined with resin particles before mixing with the other LEP ink components. The resin particles can be formed as a result of microfluidizing and can be from about 1 to about 10 μm in size in some examples and from about 2 to about 5 μm in size in other examples.

The resin combined with the colorant(s) can be the same as the resin described below as component (C).

(C) Resin

In some examples, the LEP inks described herein can comprise a resin. In some examples, the resin can comprise an ethylene acid copolymer.

Examples of ethylene acid copolymers added to the LEP inks described herein can include copolymers having an acid number between about 70 and about 130, for example more than about 74 and less than about 124 such as about 74, about 76, about 105, about 115, or about 124 mg KOH/g of polymer when measured according to method ASTM D1386.

Some examples of ethylene acid copolymers can include thermoplastic ethylene acid copolymers.

These copolymers are obtainable by copolymerizing ethylene with an acid monomer selected from acrylic and/or methacrylic acid.

Some examples of ethylene acid copolymers can be commercially available. For example, they include the NUCREL® family of ethylene/(meth)acrylic acid copolymers available from DuPont, A-C® 5120 from Honeywell, or mixtures thereof.

Some examples of ethylene acid copolymers can include copolymers including ethylene and acrylic and/or methacrylic acid monomers, wherein the amount of the acid monomers can be included in an amount of between about 10 wt % and about 25 wt %, for example between about 10 wt % or about 15 wt % and about 20 wt % based on the total weight of the copolymer.

In some examples, the ethylene acid copolymer is an ethylene-co-acrylic acid polymer and/or an ethylene-co-methacrylic acid polymer and can comprise acrylic and/or methacrylic acid monomers in an amount comprised between about 15 wt % and about 20 wt % based on the total weight of the copolymer.

In some examples, the resin can comprise an ethylene acid copolymer. The foregoing examples, however, do not exclude component (A), (B), (D), or (E) comprising the LEP inks described herein.

In other examples, the resin can comprise an ethylene acid copolymer and at least one other polymer.

The polymer can include, but is not limited to, a thermoplastic polymer. A thermoplastic polymer can sometimes be referred to as a thermoplastic resin. In some examples, the polymer may be selected from ethylene acrylic acid copolymers; methacrylic acid copolymers; ethylene vinyl acetate copolymers; copolymers of ethylene (e.g., about 80% to about 99.9%), and alkyl (e.g., C1 to C5) ester of methacrylic or acrylic acid (e.g., about 0.1% to about 20%); copolymers of ethylene (e.g., about 80% to about 99.9%), acrylic or methacrylic acid (e.g., about 0.1% to about 20.0%) and alkyl (e.g., C1 to C5) ester of methacrylic or acrylic acid (e.g., about 0.1% to about 20%); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g., copolymer of acrylic or methacrylic acid and at least one alkyl ester of acrylic or methacrylic acid wherein alkyl can have from 1 to about 20 carbon atoms, such as methyl methacrylate (e.g., about 50% to about 90%)/methacrylic acid (e.g., about 0% to about 20%)/ethylhexylacrylate (e.g., about 10% to about 50%)); ethylene-acrylate terpolymers: ethylene-acrylic esters-maleic anhydride (MAH) or glycidyl methacrylate (GMA) terpolymers; ethylene-acrylic acid ionomers and combinations thereof.

The polymer may be a polymer having acidic side groups. The polymer having acidic side groups may have an acidity of about 50 mg KOH/g or more. The acidic side groups may be in free acid form or may be in the form of an anion and associated with counterions, such as metal counterions, e.g., a metal selected from the alkali metals, such as lithium, sodium and potassium, alkali earth metals, such as magnesium or calcium, and transition metals, such as zinc. The polymer having acidic sides groups can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g., Zn, Na, Li) such as SURLYN® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitute from about 5 wt % to about 25 wt % of the copolymer, or from about 10 wt % to about 20 wt % of the copolymer.

In an example, the resin can constitute from about 5 wt % to about 90 wt % of the solids of the LEP inks described herein. In another examples, the resin can constitute from about 10 wt % to about 60 wt % of the solids of the LEP inks described herein. In another example, the resin can constitute from about 5 wt % to about 90 wt % of the solids of the LEP inks described herein.

In some examples, the resin can comprise NUCRELO family of polymers from DuPont, BYNELO family of polymers from DuPont, A-C® 5120 from Honeywell, or mixtures thereof. Examples include NUCRELO 403, NUCRELO 407, NUCRELO 609HS, NUCRELO 908HS, NUCRELO 1202HC, NUCRELO 30707, NUCRELO 1214, NUCRELO 903, NUCRELO 3990, NUCRELO 910, NUCRELO 925, NUCRELO 609, NUCRELO 599, NUCRELO 960, NUCRELO RX 76, NUCRELO 2806, BYNELO 2002, BYNELO 2014, and BYNELO 2020), the ACLYNO family of polymers (available from Honeywell International, Inc., Morristown, N.J., USA, e.g., ACLYNO 201, ACLYNO 246, ACLYNO 285, and ACLYNO 295), or the LOTADERO family of polymers (available from Arkema, Inc., King of Prussia, Pa., USA, e.g., LOTADERO 2210, LOTADERO 3430, LOTADERO 8200, or mixtures thereof.

(D) Ethylene/(Meth)acrylic Acid $C_{1-10}$ Alkyl Ester Copolymer(s)

The ethylene/(meth)acrylic acid $C_{1-10}$ alkyl ester copolymer may refer to a polymer obtainable by copolymerizing ethylene and (meth)acrylic acid $C_{1-10}$ alkyl ester monomers. For example, the copolymer may be an ethylene-co-acrylic acid $C_{1-10}$ alkyl ester polymer or an ethylene-co-methacrylic acid $C_{1-10}$ alkyl ester polymer. In one example, the ethylene/(meth)acrylic acid $C_{1-10}$ alkyl ester copolymer does not include any one of the following monomers: styrene, butadiene, vinyltoluene, 2-hydroxyethylmethacrylate.

Examples of ethylene/(meth)acrylic acid $C_{1-10}$ alkyl ester copolymers can include copolymers in which the $C_{1-10}$ alkyl ester is for example a $C_{1-6}$ alkyl ester or $C_{1-4}$ alkyl ester, such as methyl or butyl. Mixtures of alkyl isomers can also be used. For example, when the alkyl is butyl, it can be any one of normal, iso- and/or tert-butyl.

In some examples, ethylene/(meth)acrylic acid $C_{1-10}$ alkyl ester copolymer can have an average molecular weight between about 10,000 and about 100,000 Dalton. For example, a copolymer can be an ethylene/(meth)acrylic acid $C_{1-4}$ alkyl ester copolymer having an average molecular weight between about 10,000 and about 100,000 Dalton.

Examples of copolymers may be selected from the group consisting of (i) an ethylene/methyl acrylate copolymer wherein the methyl acrylate is present in an amount of about 20% by weight over the weight of the copolymer, (ii) an ethylene/methyl acrylate copolymer wherein the methyl acrylate is present in an amount of about 24% by weight over the weight of the copolymer, (iii) an ethylene/butyl acrylate copolymer wherein the butyl acrylate is present in an amount of about 27% by weight over the weight of the copolymer, and (iv) mixtures thereof.

Examples of commercially available copolymers can include NUCREL® 699 (is a copolymer of ethylene and methacrylic acid with about an 11 wt % methacrylic acid comonomer content), Elvaloy® AC 1820 (ethylene-co-methyl acrylate containing about 20% by weight of methyl acrylate), Elvaloy® AC 12024S (mixture of an ethylene-co-methyl acrylate containing about 24% by weight of methyl acrylate and antioxidant additives) and Elvaloy® AC 3427 (ethylene-co-butyl acrylate containing about 27% by weight of methyl acrylate), all available from DuPont Company, Wilmington, Del.

The ethylene/(meth)acrylic acid $C_{1-10}$ alkyl ester copolymer may be present in an amount between about 5% and about 10%, upper and lower limits included, by weight over the weight of the LEP ink solids. For example, the ethylene/(meth)acrylic acid $C_{1-10}$ alkyl ester copolymer may be present in an amount between about 5% or about 6%, or about 7%, or about 8%, or about 9% and about 10% by weight over the weight of the LEP ink solids. For example, the ethylene/(meth)acrylic acid $C_{1-10}$ alkyl ester copolymer is ethylene-co-butyl acrylate and is present in an amount of about 10% by weight over the weight of the LEP ink solids.

In one example:
the ethylene acid copolymer can include an ethylene/(meth)acrylic acid copolymer, and
the ethylene/(meth)acrylic acid $C_{1-10}$ alkyl ester copolymer is an ethylene/(meth)acrylic acid $C_{1-4}$ alkyl ester, such as methyl or butyl ester (e.g., ethylene-co-butyl acrylate).

The combined amount of an ethylene acid copolymer and an ethylene/(meth)acrylic acid $C_{1-10}$ alkyl ester copolymer as presently defined may constitute between about 1% and about 100%, for example between about 50% and about 90% or between about 70% and about 90% by weight over the weight of LEP ink solids.

Examples of polymer mixtures of an ethylene acid copolymer and an ethylene/(meth)acrylic acid $C_{1-10}$ alkyl ester copolymer can have a melt viscosity between about $10^4$ and about $5\times10^6$ poise, such as about 60,000 and about 200,000 poise. Melt viscosity can be measured using standard techniques. The melt viscosity can be measured using a rheometer, e.g., a commercially available AR-2000 Rheometer from Thermal Analysis Instruments, using the geometry of: 25 mm steel plate-standard steel parallel plate, and finding the plate over plate rheometry isotherm at about 120° C., about 0.01 Hz shear rate. Melt viscosity may be measured on mixtures containing about 100% solids.

The ethylene acid copolymer and the ethylene/(meth) acrylic acid $C_{1-10}$ alkyl ester copolymer may form polymer particles having a $D_{50}$ diameter between about 3 and about 9 microns, or between about 5 and about 7 microns. The particles may also include a colorant.

(E) Condensation Product(s) of Urea and Aldehyde(s)

The polymeric resin present in the LEP ink(s) described herein can include at least one grinding resin and/or at least one binder.

In some examples, the resin and/or the binder can comprise at least one polymeric condensation product of urea and aldehyde. The aldehyde, in some examples, can be aliphatic, for example, a $C_{1-10}$ aliphatic-aldehyde and/or at least one (cyclo)aliphatic ketone, such as cyclohexanone or methylcyclohexanone, or mixtures thereof.

In some examples, the condensation product of urea and aldehyde can comprise at least one $C_{1-10}$ aliphatic-aldehyde, at least one $C_{5-12}$ (cyclo)aliphatic ketone, or mixtures thereof. The at least one (cyclo)aliphatic ketone can be cyclohexanone, methylcyclohexanone, or mixtures thereof.

In some examples, the condensation product of urea and aldehyde can comprise $C_{1-5}$ aliphatic aldehydes. The $C_{1-5}$ aliphatic aldehyde can comprise formaldehyde.

In some examples, the at least one binder in the LEP ink(s) can comprise at least one polymeric condensation product of urea and at least one aliphatic aldehyde as polymeric resin component. In some examples, products available commercially can include LAROPAL® products from BASF Corp (e.g., LAROPAL® A 101 and/or LAROPAL® A 81). Other examples of commercially available urea-aldehyde condensates can include Casco® UF-85 concentrate from Hexion Specialty Chemical, Inc. (formerly Borden Chemical, Inc.).

In some examples, the urea-aldehyde condensate can be formed by the reaction of urea and an aldehyde under alkaline conditions. The urea may be derived from a variety of commercially available forms, for example solid urea, such as prill, and aqueous urea solutions. Aldehydes—e.g., formaldehyde—can be used to produce the aqueous urea-aldehyde condensate composition. Examples of other aldehydes that may be used include acetaldehyde, propionaldehyde, furfuraldehyde, glutaraldehyde, benzaldehyde, or mixtures thereof.

In some examples, the urea-aldehyde condensate can be formed from formaldehyde or aldehyde mixtures comprising formaldehyde. The formaldehyde may be used in the form of a gas, a formalin solution (an aqueous solution of formaldehyde) in concentrations of from about 15 wt % to about 90 wt %, as paraformaldehyde (solid, polymerized formaldehyde), or as a mixture thereof. In some examples, the aldehyde can be used in an amount of from about 0.1 to about 5.0 moles per mole of phenol as calculated using the aldehyde content of the urea-aldehyde condensate.

In some examples, the relative amounts of aldehyde, urea, and water used to form the urea-aldehyde condensate and effective times and temperature for reaction can depend on the concentrations of aldehyde, urea-aldehyde condensate composition, and water in the condensate composition.

In some examples, the urea-aldehyde condensate may comprise from about 0.1 to about 50 wt %, in some examples from about 10 wt % to about 30 wt %, and in some examples from about 20 wt % to about 25 wt % aldehyde (e.g., formaldehyde). In some examples, the urea-aldehyde condensate can comprise from about 20 wt % to about 90 wt %, in some examples from about 50 wt % to about 75 wt %, and in some examples from about 60 wt % to about 65 wt % urea-aldehyde. In some examples, the urea-aldehyde condensate can comprise from about 0 wt % to about 60 wt %, in some examples from about 5 wt % to about 35 wt %, and in some examples from about 0 wt % water.

In some examples, the urea-aldehyde condensate can comprise urea, aldehyde, and water. In some examples, the condensate can comprise from about 70 wt % to about 30 wt % aldehyde, from about 30 wt % to about 60 wt % urea, and from about 0 wt % to about 10 wt % water.

It would be understood to one of skill in the art that the aldehyde content of the condensate can be distributed at least between the aldehyde reacted with the urea to form alkylol groups and free aldehyde. The distribution ratio of these forms of the aldehyde will be influenced by the ratios of aldehyde, urea, and water, and additionally by reaction time, temperature, processing conditions such as the use of a vacuum strip or reflux, and concentration. Additional variations of the ratios of formaldehyde, urea, and water, as well as variations in reaction conditions as described above, may be used, which can provide a condensate that can be successfully used in the LEP inks described herein.

In some examples, the condensation product of urea and aldehyde can be obtained by mixing (i) from about 20 wt % to about 80 wt %, or from about 30 wt % to about 70 wt %, or from about 50 wt % to about 65 wt % aldehyde; (ii) from about 5 wt % to about 70 wt %, or from about 15 wt % to about 50 wt %, or from about 20 wt % to about 40 wt % urea; and (iii) from about 0.01 wt % to about 1.0 wt %, or from about 0.02 wt % to about 0.5 wt %, or from about 0.03 wt % to about 0.4 wt % of a catalytic base in water at a temperature of from about 40° C. to about 100° C. or from about 75° C. to about 85° C., for about 1 to about 24 hours depending on process.

The urea-aldehyde condensates may be prepared in a container such as a laboratory flask or plant reactor. Additionally, the urea-aldehyde condensate composition may be prepared using a continuous flow process or a batch process. The continuous flow process may comprise adding gaseous from of aldehyde, about 50 wt % urea in aqueous medium, and a base catalyst to an absorber column.

In some examples, water is removed from the condensate composition during this process prior to adding to the LEP inks described herein.

In some examples, the condensate can also be made with an acid catalyst instead of or in addition to a base catalyst.

In some examples, the condensation product of urea and aldehyde can be present in the above-described LEP ink(s) in an amount of from about 5 wt % to about 40 wt % based on the total weight of (C), (D), and (E). In some examples, the condensation product of urea and aldehyde can be present in the above-described LEP ink(s) in an amount of from about 10 wt % to about 20 wt % based on the total weight of (C), (D), and (E).

Charge Director and Charge Adjuvant

The LEP ink composition described herein may include a charge director. The charge director may be added to an LEP ink composition in order to impart and/or maintain sufficient electrostatic charge on the LEP ink particles. In some examples, the charge director may be selected from ionic compounds, such as metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, or mixtures thereof. In some examples, the charge director is selected from, but is not limited to, oil-soluble petroleum sulfonates (e.g., neutral Calcium Petronate™, neutral Barium Petronate™, and basic Barium Petronate™), polybutylene succinimides (e.g., OLOA™ 1200 and Amoco 575), and glyceride salts (e.g., sodium salts of phosphated mono- and diglycerides with unsaturated and saturated acid substituents), sulfonic acid salts including, but not limited to, barium, sodium, calcium, and aluminum salts of a sulfonic acid. The sulfonic acids may include, but are not limited to, alkyl sulfonic acids, aryl sulfonic acids, and sulfonic acids of alkyl succinates. In some examples, the charge director imparts a negative charge on the particles of the LEP ink composition. In some examples, the charge director imparts a positive charge on the particles of the LEP ink composition.

In some examples, the charge director can include a sulfosuccinate moiety of the general formula [$R_1$—O—C(O)$CH_2$CH($SO_3^-$)C(O)—O—$R_2$], where each of $R_1$ and $R_2$ is an alkyl group. In some examples, the charge director can include nanoparticles of a simple salt and a sulfosuccinate salt of the general formula MAn, wherein M is a metal, n is the valence of M, and A is an ion of the general formula [$R_1$—O—C(O)$CH_2$CH($SO_3^-$)C(O)—O—$R_2$], where each of $R_1$ and $R_2$ is an alkyl group.

In some examples, the sulfosuccinate salt of the general formula MAn is an example of a micelle forming salt. The charge director may be substantially free or free of an acid of the general formula HA, where A is as described above. The charge director may include micelles of said sulfosuccinate salt enclosing at least some of the nanoparticles. The charge director may include at least some nanoparticles having a size of about 200 nm or less, and/or in some examples about 2 nm or more. In some examples, simple salts are salts that do not form micelles by themselves, although they may form a core for micelles with a micelle forming salt. The ions constructing the simple salts are all hydrophilic. The simple salt may include a cation selected from the group consisting of Mg, Ca, Ba, $NH_4$, tert-butyl ammonium, Li+, and Al+3, or from any sub-group thereof. The simple salt may include an anion selected from the group consisting of $SO_4^{2-}$, $PO^{3-}$, $NO^{3-}$, $HPO_4^{2-}$, $CO_3^{2-}$, acetate, trifluoroacetate (TFA), Cl$^-$, $BF_4^-$, F—, $ClO_4$—, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)_3$, $LiClO_4$ and $LiBF_4$, or any sub-group thereof. The charge director may further include basic barium petronate (BBP).

In the formula [$R_{1'}$—O—C(O)$CH_2$CH($SO_3^-$)C(O)—O—$R_{2'}$], in some examples each of $R_{1'}$ and $R_{2'}$ is an aliphatic alkyl group. In some examples, each of $R_{1'}$ and $R_{2'}$ independently is a $C_{6-25}$ alkyl. In some examples, said aliphatic alkyl group is linear. In some examples, said aliphatic alkyl group is branched. In some examples, said aliphatic alkyl group can include a linear chain of more than 6 carbon atoms. In some examples, $R_{1'}$ and $R_{2'}$ are the same. In some examples, at least one of $R_{1'}$ and $R_{2'}$ is $C_{13}H_{27}$. In some examples, M is Na, K, Cs, Ca, or Ba.

The charge director may include one of, some of or all of (i) soya lecithin, (ii) a barium sulfonate salt, such as BBP, and (iii) an isopropyl amine sulfonate salt. Basic barium petronate is a barium sulfonate salt of a 21-26 hydrocarbon alkyl, and can be obtained, for example, from Chemtura. An example isopropyl amine sulfonate salt is dodecyl benzene sulfonic acid isopropyl amine, which is available from Croda.

In some examples, the charge director constitutes about 0.001% to about 20%, in some examples about 0.01% to about 20% by weight, in some examples about 0.01 to about 10% by weight, in some examples about 0.01% to about 1% by weight of the solids of an LEP ink composition. In some examples, the charge director constitutes about 0.001% to 0.15% by weight of the solids of the LEP ink composition, in some examples about 0.001% to about 0.15%, in some examples about 0.001% to about 0.02% by weight of the solids of an LEP ink composition, in some examples about 0.1% to about 2% by weight of the solids of the LEP ink composition, in some examples about 0.2% to about 1.5% by weight of the solids of the LEP ink composition in some examples about 0.1% to about 1% by weight of the solids of the LEP ink composition, in some examples about 0.2% to about 0.8% by weight of the solids of the LEP ink composition.

The LEP ink composition may include a charge adjuvant. A charge adjuvant may promote charging of the particles when a charge director is present. The method as described here may involve adding a charge adjuvant at any stage. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or can include aluminum di- or tristearate. The charge adjuvant may be present in an amount of about 0.1 to about 5% by weight, in some examples about 0.1 to about 1% by weight, in some examples about 0.3 to about 0.8% by weight of the solids of the LEP ink composition, in some examples about 1 wt % to about 3 wt % of the solids of the LEP ink composition, in some examples about 1.5 wt % to about 2.5 wt % of the solids of the LEP ink composition.

In some examples, the LEP ink composition can further include a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation can include a metal selected from Ca, Sc, Ti, V, Cr, Mn, Fe, Co, Ni, Cu, Zn, Al and Pb. In some examples, the multivalent cation is Al3+. The fatty acid anion may be selected from a saturated or unsaturated fatty acid anion. The fatty acid anion may be selected from a $C_8$ to $C_{26}$ fatty acid anion, in some examples a $C_{14}$ to $C_{22}$ fatty acid anion, in some examples a $C_{16}$ to $C_{20}$ fatty acid anion, in some examples a $C_{17}$, $C_{18}$ or $C_{19}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

In some examples, the LEP ink composition can further include a salt of multivalent cation and a fatty acid anion and the composition further can include a charge director selected from metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, and organic acid esters of polyvalent alcohols. In some examples, the LEP ink composition further can include a salt of multivalent cation and a fatty acid anion and the composition further can include a charge director selected from a sulfosuccinate moiety of the general formula [$R_1$—O—C(O)$CH_2$CH($SO_3$)C(O)—O—$R_2$], where each of $R_1$ and $R_2$ is an alkyl group, which may be as described above.

The charge adjuvant, which may, for example, be or include a salt of multivalent cation and a fatty acid anion, may be present in an amount of about 0.1 wt % to about 5 wt % of the solids of the LEP ink composition, in some examples in an amount of about 0.1 wt % to about 2 wt % of the solids of the LEP ink composition, in some examples in an amount of about 0.1 wt % to about 2 wt % of the solids of the LEP ink composition, in some examples in an amount of about 0.3 wt % to about 1.5 wt % of the solids of the LEP ink composition, in some examples about 0.5 wt % to about 1.2 wt % of the solids of the LEP ink composition, in some examples about 0.8 wt % to about 1 wt % of the solids of the LEP ink composition, in some examples about 1 wt % to about 3 wt % of the solids of the LEP ink composition, in some examples about 1.5 wt % to about 2.5 wt % of the solids of the LEP ink composition.

Other Additives

The LEP inks described herein may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the LEP ink to the print substrate, e.g., from an intermediate transfer member, which may be a heated blanket.

In some examples, a wax such as a polyethylene wax (e.g., ACumist® B-6, available from Honeywell) can be added to the LEP inks described herein.

In some examples, a surfactant such as a fluorosurfactant (e.g., Zonyl® MP 1200 available from DuPont) can be added to the LEP inks described herein.

The amounts of the other additives added to the LEP inks described herein can be from about 0 wt % to about 20 wt % based on the total weight of the LEP ink composition. In some examples, the other additives can be can be present in the LEP inks described herein in an amount of from about 1 wt % to about 10 wt % based on the total weight of the LEP ink composition.

Method(s) of Making Liquid Electrophotographic Ink(s)

In one example, the present disclosure discloses a method for the manufacture of an LEP ink as defined above, said method including mixing:

(A) a liquid vehicle,
(B) at least one colorant,
(C) a resin comprising an ethylene acid copolymer,
(D) an ethylene/(meth)acrylic acid $C_{1-10}$ alkyl ester copolymer selected from the group consisting of an ethylene/methyl acrylate copolymer and an ethylene/butyl acrylate copolymer, and
(E) a condensation product of urea and aldehyde; and forming particles having a size of about 0.01 to about 50 microns by grinding (B), (C), (D), and (E).

In some examples, the method of making the LEP ink can exclude mixing of (B) at least one colorant.

In some examples, the method of making an LEP ink may include:

i) forming LEP ink particles by mixing an ethylene acid copolymer with an ethylene/(meth)acrylic acid $C_{1-10}$ alkyl ester copolymer, said copolymer being present in an amount as presently disclosed, in the presence of a liquid vehicle, ii) grinding the particles obtained in i) till the achievement of a particle size from about 1 micron to about 25 microns.

In some examples, grinding may include adding a second amount of liquid vehicle before or during grinding.

Process conditions to perform grinding may be adjusted depending on the specific colorant. Grinding may be performed for example for a time between about 1 and about 20 hours, for example between about 1 and about 15 hours, for example between about 10 and about 15 hours. Grinding can be performed using a single temperature profile or a temperature profile with stages. For example, temperature may not be higher than about 50° C., such as not higher than about 45° C.

If a colorant is added, it may be added either in i) or ii).

If a charge adjuvant, a charge director, a surface modifier, compatibility additives, charging additives, a wax, a biocide, a sequestering agent, a preservative, an emulsifier or transfer additives is/are added, these ingredients may be added in ii).

Method(s) of Using Liquid Electrophotographic Ink(s)

In some examples, a method of using the LEP inks described herein can comprise making the LEP inks in the manner described above.

In some examples, the method of using the LEP inks described herein can further comprise applying the LEP ink on a media substrate. The LEP ink can be applied, in some examples, onto the substrate by an LEP apparatus.

The media substrate may include a printing substrate having an image-receiving surface, and an image printed on said surface, the image including components (C), (D), and (E). The image may further include component (B) at least one colorant.

The print substrate can be any substrate that can be used in printing applications. The print substrate can be a substrate capable of having an image printed thereon. The print substrate may include a material, which may be termed a print material or substrate, selected from an organic or inorganic material. The print material may include a natural polymeric material, e.g., cellulose. The print material may include a synthetic polymeric material, e.g., a polymer formed from alkylene monomers, including, but not limited to, polyethylene and polypropylene, and co-polymers such as styrene-polybutadiene. The polypropylene may, in some examples, be biaxially orientated polypropylene. The material may include a metal, which may be in sheet form. The metal may be selected from or made from, for instance, aluminum (Al), silver (Ag), tin (Sn), copper (Cu), mixtures thereof.

In an example, the substrate can include a cellulosic paper. In an example, the cellulosic paper is coated with a polymeric material, e.g., a non-cellulosic polymer, e.g., a polymer formed from styrene-butadiene resin. In some examples, the cellulosic paper has an inorganic material bound to its surface (before printing with LEP ink) with a polymeric material, wherein the inorganic material may be selected from, for example, kaolinite or calcium carbonate. The substrate is, in some examples, a cellulosic print substrate such as paper. The cellulosic print substrate is, in some examples, a coated cellulosic print substrate. In some examples, the substrate is a gloss print substrate, in some examples a gloss paper.

The applying of the LEP ink to a media substrate can include printing the LEP ink. The printing can be electrophotographic printing, which is also known as electrostatic printing. The printing method can include providing an LEP ink composition as described herein, contacting the LEP ink composition with a latent electrostatic image (also known as electrophotographic image) on a surface to create a developed image, and transferring the developed image to a print substrate, in some examples via an intermediate transfer member.

In some examples, the surface on which the (latent) electrostatic image is formed or developed may be on a rotating member, e.g., in the form of a cylinder. The surface on which the (latent) electrostatic image is formed or developed may form part of a PIP. The method may involve passing the LEP ink composition between a stationary electrode and a rotating member, which may be a member having the surface having the (latent) electrostatic image thereon or a member in contact with the surface having the (latent) electrostatic image thereon. A voltage is applied between the stationary electrode and the rotating member, such that particles adhere to the surface of the rotating member. The intermediate transfer member, if present, may be a rotating flexible member, which may be heated, e.g., to a temperature of from about 80° C. to about 160° C.

Printing System(s)

In some examples, an LEP printing system can comprise a liquid electrophotographic printer; and an LEP ink loaded in the liquid electrophotographic printer. The LEP ink, as described above, can comprise (A) a liquid vehicle, (B) at least one colorant, (C) a resin comprising an ethylene acid copolymer, (D) an ethylene/(meth)acrylic acid $C_{1-10}$ alkyl ester copolymer selected from the group consisting of an ethylene/methyl acrylate copolymer and an ethylene/butyl acrylate copolymer, and (E) a condensation product of urea and aldehyde.

In some examples, the LEP printing system comprising the LEP ink can comprise at least one colorant.

In some examples, the LEP ink can comprise (C) the ethylene acid copolymer, which is an ethylene-co-acrylic acid polymer and/or an ethylene-co-methacrylic acid polymer and can comprise acrylic and/or methacrylic acid monomers in an amount comprised between about 15 wt % and about 20 wt % based on the total weight of the copolymer. In some examples, the LEP ink can comprise (E) the condensation product of urea and aldehyde, which can comprise formaldehyde and (E) the condensation product of urea and aldehyde can be present in the liquid LEP ink in an amount of from about 10 wt % to about 20 wt % based on the total weight of (C), (D), and (E).

Further examples will become apparent to a skilled reader in light of the examples provided below.

EXAMPLES

Example 1

LEP ink compositions A-D were prepared as described in Tables 1 and 2 below.

TABLE 1

|  | A | B | C | D |
| --- | --- | --- | --- | --- |
| NUCREL ® 699 | 64 wt % | 64 wt % | 72 wt % | 72 wt % |
| A-C ® 5120 | 16 wt % | 16 wt % | 18 wt % | 18 wt % |
| LAROPAL ® A 101 | 20 wt % | — | 10 wt % | — |
| LAROPAL ® A 81 | — | 20 wt % | — | 10 wt % |
| % NVS (non-volatile solids) | 40%-solid 60% Liquid (Sol L) | 40%-solid 60% Liquid (Sol L) | 40%-solid 60% Liquid (Sol L) | 40%-solid 60% Liquid (Sol L) |

TABLE 2

| Materials | wt % |
| --- | --- |
| Paste A, B, C, or D | 73.80 |
| Main pigment-CARBON BLACK | 15.8 |
| Secondary pigment- Print Alkali Blue D 6200 | 3.2 |
| Charge adjuvant (aluminum tristearate) | 1.2 |
| ACumist ® B-6 | 6.00 |

Composition pastes A-D were prepared as shown in Table 1 above. All components from Table 1 were inserted in a Ross tool and were melted by mixing at 130° C. and 50 rpm over about 60 minutes. The mixing speed was then increased to 70 rpm and mixing continued at this speed for about 90 minutes. The obtained pastes were then cooled down for about 3-4 hours to a temperature of about 25° C. under constant mixing at a decreased speed of 50 rpm. The obtained cooled pastes had about 42% NVS.

The pastes A-D, Isopar-L® in an amount of 80 wt % based on the total weight of the composition, the pigments, the charge adjuvant, and the wax were loaded into an Attritor containing metal grinding balls. The grinding process was performed at 58° C. (at a mixing speed of 250 rpm) for about 1.5 hours and then for about 10.5 hours at 36° C. (at a mixing speed of 250 rpm). After reaching an average particle size of below about 8 microns, the compositions A-D were diluted with Isopar-L® in an amount of 88 wt % based on the total weight of the composition, and mixed for about 15 minutes and then discharged to a receiving container. The % NVS of the obtained compositions A-D was in the range of about 10-13% NVS.

Then 4.5 kg of each of the obtained compositions A-D were further diluted to 2% NVS using 2916 kg of Isopar-L® and Zonyl® MP 1200 was added in an amount of 2.1 grams to obtain the LEP ink compositions.

After allowing the LEP ink compositions A-D to sit overnight, these compositions were then used for printing.

Example 2

An LEP ink composition E was prepared as described in Tables 3 and 4 below.

TABLE 3

|  | E |
| --- | --- |
| NUCREL ® 699 | 80 wt % |
| A-C ® 5120 | 20 wt % |
| % NVS | 40%-solid |
|  | 60% Liquid |
|  | (Sol L) |

TABLE 4

| Materials | wt % |
| --- | --- |
| Paste A, B, C, or D | 53.80 |
| Main pigment-CARBON BLACK | 15.8 |
| Secondary pigment- Print Alkali Blue D 6200 | 3.2 |
| Charge adjuvant (aluminum tristearate) | 1.2 |
| LAROPAL ® A 101 | 10.0 |
| LAROPAL ® A 81 | 10.0 |
| ACumist ® B-6 | 6.00 |

Composition paste E was prepared as shown in Table 3 above. All components from Table 3 were inserted in a Ross tool and were melted by mixing at 130° C. and 50 rpm over about 60 minutes. The mixing speed was then increased to 70 rpm and mixing continued at this speed for about 90 minutes. The obtained paste was then cooled down for about 3-4 hours to a temperature of about 25° C. under constant mixing at a decreased speed of 50 rpm. The obtained cooled paste had about 42% NVS.

The paste E, Isopar-L® in an amount of 80 wt % based on the total weight of the composition, the pigments, the charge adjuvant, LAROPAL® A 101, LAROPAL® A 81, and the wax were loaded into an Attritor containing metal grinding balls. The grinding process was performed at 58° C. (at a mixing speed of 250 rpm) for about 1.5 hours and then for about 10.5 hours at 36° C. (at a mixing speed of 250 rpm). After reaching an average particle size of below about 8 microns, the composition E was diluted with Isopar-L® in an amount of 88 wt % based on the total weight of the composition, and mixed for about 15 minutes and then discharged to a receiving container. The % NVS of the obtained composition E was about 12% NVS.

Then 4.5 kg of each of the obtained composition E was further diluted to 2% NVS using 2916 kg of Isopar-L® and Zonyl® MP 1200 was added in an amount of 2.1 grams to obtain the LEP ink composition.

After allowing the LEP ink composition E to sit overnight, this composition was then used for printing.

Comparative Example 1

A reference LEP ink composition—Ref—was prepared as described in Tables 5 and 6 below.

TABLE 5

|  | Ref |
| --- | --- |
| NUCREL ® 699 | 80 wt % |
| A-C ® 5120 | 20 wt % |
| % NVS | 40%-solid |
|  | 60% Liquid |
|  | (Sol L) |

TABLE 6

| Materials | wt % |
| --- | --- |
| Paste A, B, C, or D | 73.80 |
| Main pigment-CARBON BLACK | 15.8 |
| Secondary pigment- Print Alkali Blue D 6200 | 3.2 |
| Charge adjuvant (aluminum tristearate) | 1.2 |
| ACumist ® B-6 | 6.00 |

Composition paste Ref was prepared as shown in Table 5 above. All components from Table 5 were inserted in a Ross tool and were melted by mixing at 130° C. and 50 rpm over about 60 minutes. The mixing speed was then increased to 70 rpm and mixing continued at this speed for about 90 minutes. The obtained paste was then cooled down for about 3-4 hours to a temperature of about 25° C. under constant mixing at a decreased speed of 50 rpm. The obtained cooled paste had about 42% NVS.

The paste Ref, Isopar-L® in an amount of 80 wt % based on the total weight of the composition, the pigments, the charge adjuvant, and the wax were loaded into an Attritor containing metal grinding balls. The grinding process was performed at 58° C. (at a mixing speed of 250 rpm) for about 1.5 hours and then for about 10.5 hours at 36° C. (at a mixing speed of 250 rpm). After reaching an average particle size of below about 8 microns, the composition Ref was diluted with Isopar-L® in an amount of 88 wt % based on the total weight of the composition, and mixed for about 15 minutes and then discharged to a receiving container. The % NVS of the obtained composition Ref was about 12% NVS.

Then 4.5 kg of each of the obtained composition Ref was further diluted to 2% NVS using 2916 kg of Isopar-L® and Zonyl® MP 1200 was added in an amount of 2.1 grams to obtain the LEP ink composition.

After allowing the LEP ink composition Ref to sit overnight, this composition was then used for printing.

Example 3

Peeling tests were conducted to assess adhesion of printed images using LEP ink composition E—Test (Example 2) and LEP ink composition Ref (Comparative Example 1) on three different types of substrates—Substrate 1—UPM Finesse is a coated substrate, which is available from UPM and has a gloss finish; Substrate 2—Soporset™ is an uncoated substrate, which is available from Soporset USA and has high opacity; and Substrate 3—Anthem Plus® is a coated substrate, which is available from Verso Corporation and has a matte finish.

Figure 1B:
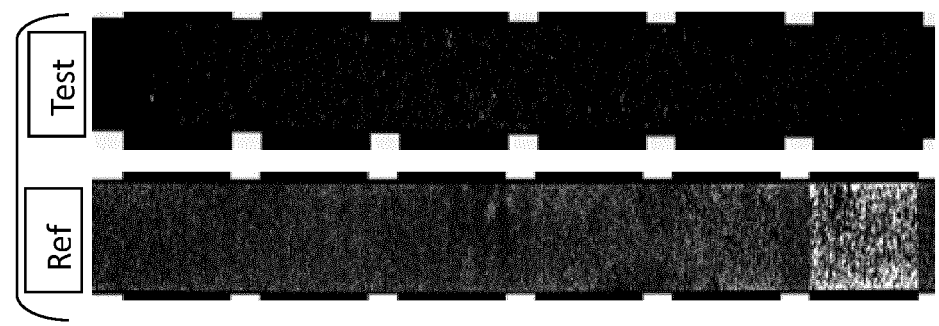
Figure 1A:
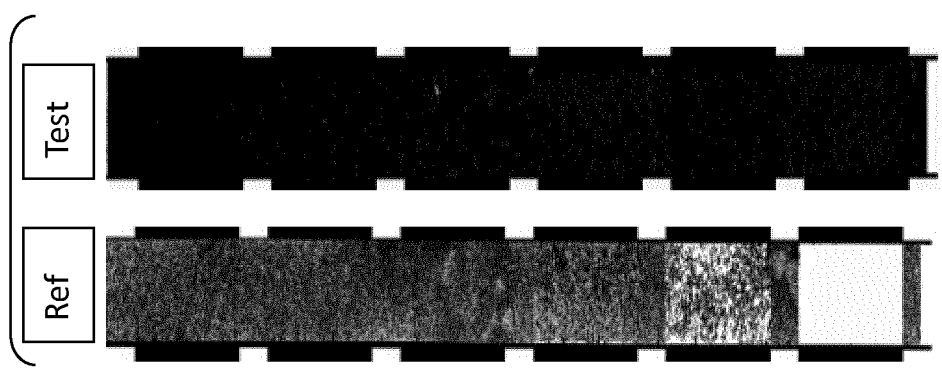

In the peeling tests, an adhesive tape (Scotch® drafting tape #230 or #234 available from 3M) was applied on a pre-designed image printed on three different types of substrates (see FIGS. 1(a), 1(b), and 1(c)).

The application of the LEP ink Test and LEP ink Ref to the three different substrates was completed with increasing coverage from 100% to 400%. FIGS. 1(a), 1(b), and 1(c) show increasing LEP ink coverage from the bottom of the images (100%) to the top of the images (400%).

The adhesion of the drafting tape to the printed images was smoothed using a heavy roller prior to peeling to decrease peel defects. The peeling test was conducted 10 minutes after printing. Finally, the drafting tapes were pulled swiftly under constant force and peeling performance was assessed visually and by scanning to determine the percentage of remaining LEP ink on the printed images.

Figure 2:
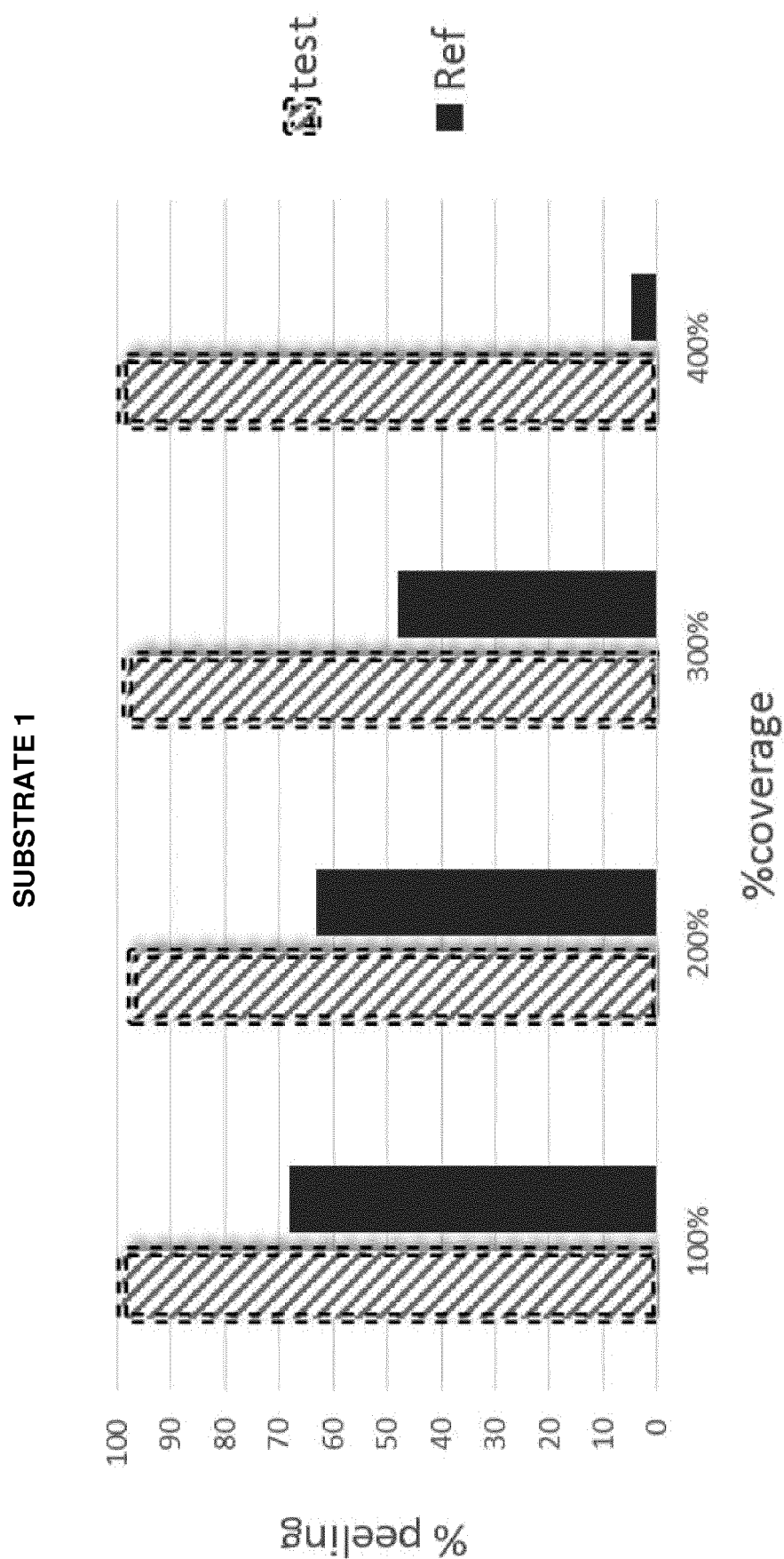
FIG. 2 is a bar graph showing the peeling performance of a liquid electrophotographic ink composition described herein compared with a reference ink on Substrate 1 (UPM Finesse)
Figure 3:
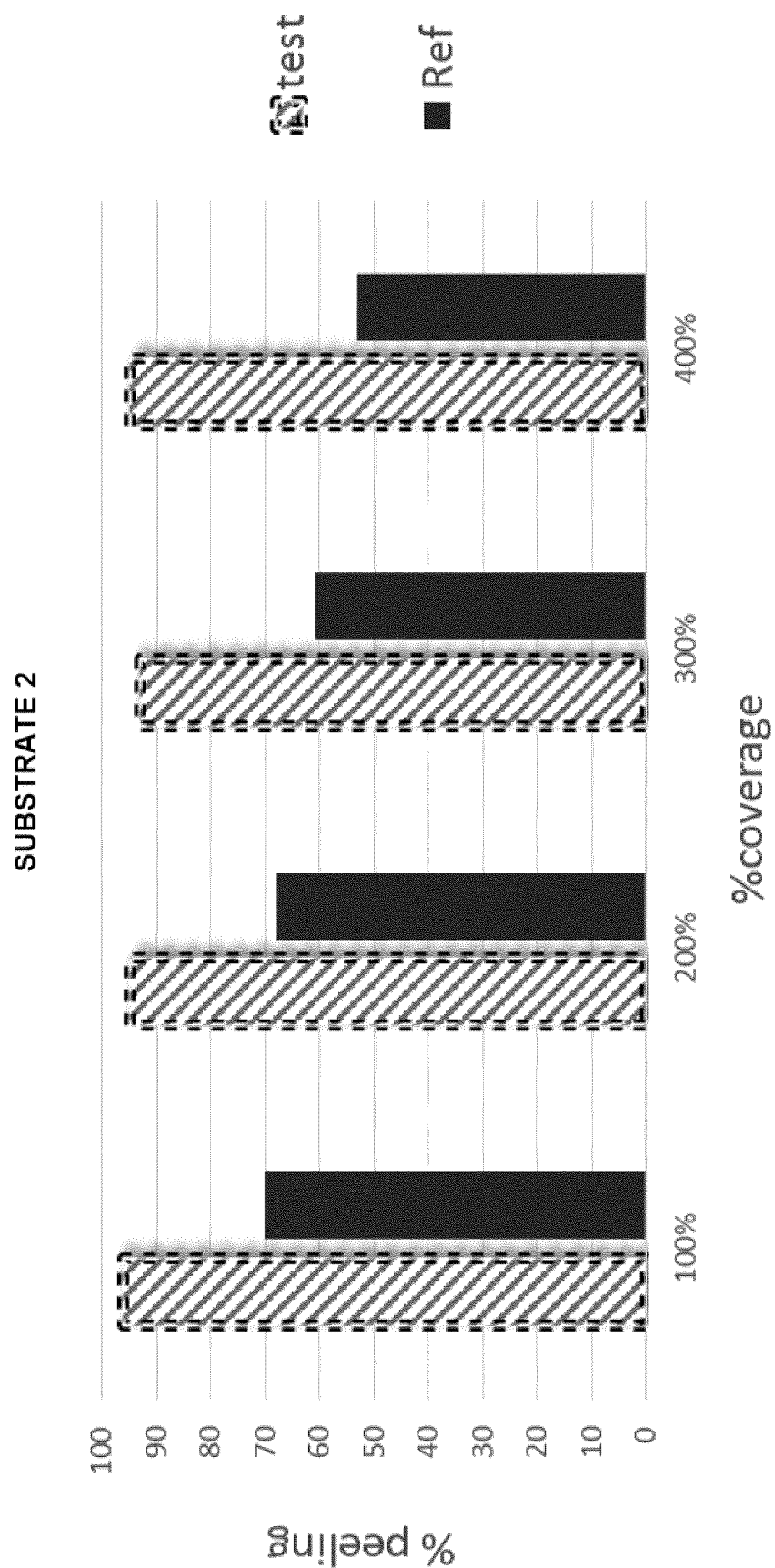
FIG. 3 is a bar graph showing the peeling performance of a liquid electrophotographic ink composition described herein compared with a reference ink on Substrate 2 (Soporset™)
Figure 4:
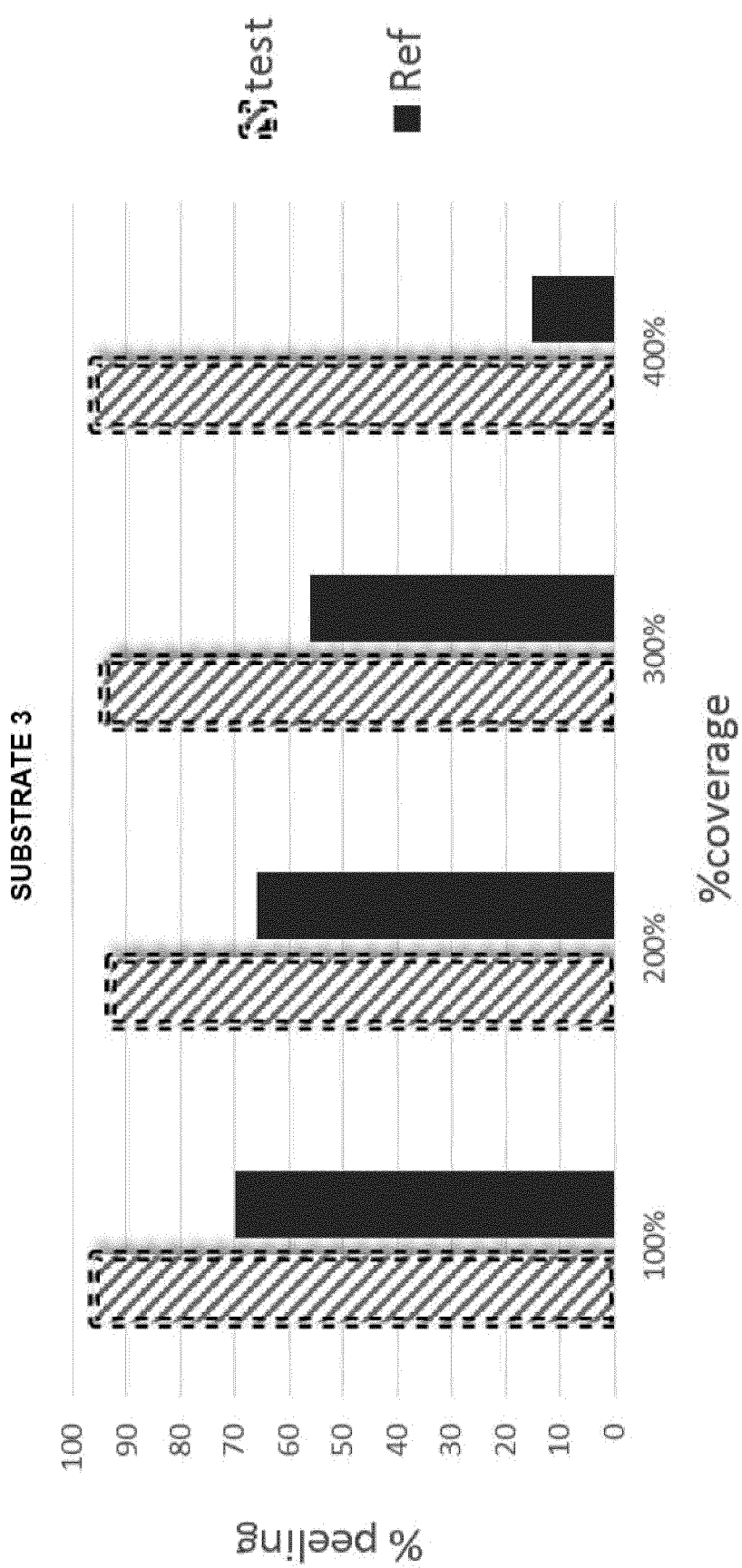
FIG. 4 is a bar graph showing the peeling performance of a liquid electrophotographic ink composition described herein compared with a reference ink on Substrate 3 (Anthem Plus®).

FIG. 2, FIG. 3, and FIG. 4 show in bar graph form that the LEP ink composition E ("Test")—remained on the three different kinds of substrates such that over 90% of the Test LEP ink remained after peeling for 100% to 400% LEP ink coverage. In contrast, the LEP Ref ink was peeled off from all three different substrates such that LEP ink composition Ref remained on the three different kinds of substrates in as low as less than 5% for 400% coverage (see FIG. 2) on Substrate 1, less than 55% for 400% coverage (see FIG. 3) on Substrate 2, and less than 15% for 400% coverage (see FIG. 4) on Substrate 3.

The above examples show that the addition of the condensation product of the urea and aldehyde to the LEP ink composition (Test—LEP Ink Composition E) when compared with the same composition without the condensation product of the urea and aldehyde (LEP Ink Composition Ref) contributed to a significant improvement in adhesion over 90% in all instances and close to 100% adhesion in some instances (see FIG. 2). In contrast, LEP Ink Composition Ref (without the condensation product of urea and aldehyde) showed significantly poor adhesion and more peeling in every instance (see FIGS. 2-4).

Without wishing to be bound by theory, the addition of the condensation product of aldehyde and urea has a high concentration of polar groups that are believed to enhance hydrogen bonds, Van der Waals forces, and dipole-dipole interactions. These bonds, forces, and/or interactions are believed to allow the LEP inks described herein to adhere more effectively to the substrates when compared with LEP inks that do not have condensation products of urea and aldehyde.

The above examples show that LEP ink peeling performance/LEP ink adhesion is significantly improved on different types of substrates because of the addition of condensation products of urea and aldehyde to the LEP inks described herein.

While several examples have been described in detail, it is to be understood that the disclosed examples may be modified. Therefore, the foregoing description is to be considered non-limiting.

What is claimed is:

1. A liquid electrophotographic ink comprising:
   (A) a liquid vehicle;
   (B) at least one colorant;
   (C) a resin comprising an ethylene acid copolymer;
   (D) an ethylene/(meth)acrylic acid $C_{1-10}$ alkyl ester copolymer selected from the group consisting of an ethylene/methyl acrylate copolymer and an ethylene/butyl acrylate copolymer; and
   (E) a condensation product of urea and aldehyde, wherein the aldehyde comprises formaldehyde.

2. The ink according to claim 1, wherein (E) the condensation product of urea and aldehyde is present in an amount of from about 5 wt % to about 40 wt % based on the total weight of (C), (D), and (E).

3. The ink according to claim 1, wherein (D) the ethylene/(meth)acrylic acid $C_{1-10}$ alkyl ester copolymer is selected from the group consisting of:
   an ethylene/methyl acrylate copolymer wherein the methyl acrylate is present in an amount of 20% by weight over the weight of the copolymer,
   an ethylene/methyl acrylate copolymer wherein the methyl acrylate is present in an amount of 24% by weight over the weight of the copolymer,
   an ethylene/butyl acrylate copolymer wherein the butyl acrylate is present in an amount of 27% by weight over the weight of the copolymer, and
   mixtures thereof.

4. The ink according to claim 1, wherein (C) the ethylene acid copolymer is an ethylene-co-acrylic acid polymer and/or an ethylene-co-methacrylic acid polymer and comprises acrylic and/or methacrylic acid monomers in an amount comprised between about 15 wt % and about 20 wt % based on the total weight of the copolymer.

5. The ink according to claim 4, wherein (C) the ethylene acid copolymer is combined with an additional polymer selected from the group consisting of poly(meth)acrylic acid, ethylene/(meth)acrylic acid/(meth)acrylic acid $C_{1-20}$ (alkyl ester terpolymers, (meth)acrylic acid/(meth)acrylic acid $C_{1-20}$ alkyl ester copolymers ethylene-acrylic acid ionomers, and mixtures thereof.

6. A method of making the liquid electrophotographic ink of claim 1 comprising:
   mixing
   (A) the liquid vehicle,
   (B) the at least one colorant,
   (C) the resin,
   (D) the ethylene/(meth)acrylic acid $C_{1-10}$ alkyl ester copolymer, and
   (E) the condensation product of urea and aldehyde; and
   forming particles having a size of 0.01 to 50 microns by grinding (B), (C), (D), and (E).

7. The method according to claim 6, wherein (E) the condensation product of urea and aldehyde is present in an amount of from about 10 wt % to about 20 wt % based on the total weight of (C), (D), and (E).

8. A liquid electrophotographic printing system comprising:
   a liquid electrophotographic printer; and
   the liquid electrophotographic ink of claim 1 loaded in the liquid electrophotographic printer,
   wherein the liquid electrophotographic ink comprises:
   (A) the liquid vehicle,
   (B) the at least one colorant,
   (C) the resin,
   (D) the ethylene/(meth)acrylic acid $C_{1-10}$ alkyl ester copolymer, and
   (E) the condensation product of urea and aldehyde.-

9. The liquid electrophotographic printing system according to claim 8, wherein:
- (C) the ethylene acid copolymer is an ethylene-co-acrylic acid polymer and/or an ethylene-co-methacrylic acid polymer and comprises acrylic and/or methacrylic acid monomers in an amount comprised between 15% and 20% by weight over the weight of the copolymer; and
- (E) the condensation product of urea and aldehyde is present in the liquid electrophotographic ink in an amount of from about 10 wt % to about 20 wt/o based on the total weight of (C), (D), and (E).

10. A liquid electrophotographic ink comprising:
- (A) a liquid vehicle;
- (B) at least one colorant;
- (C) a resin comprising an ethylene acid copolymer;
- (D) an ethylene/(meth)acrylic acid $C_{1-10}$ alkyl ester copolymer selected from the group consisting of:
  - an ethylene/methyl acrylate copolymer wherein the methyl acrylate is present in an amount of 20% by weight over the weight of the copolymer,
  - an ethylene/methyl acrylate copolymer wherein the methyl acrylate is present in an amount of 24% by weight over the weight of the copolymer,
  - an ethylene/butyl acrylate copolymer wherein the butyl acrylate is present in an amount of 27% by weight over the weight of the copolymer, and
  - mixtures thereof; and
- (E) a condensation product of urea and aldehyde or (cyclo)aliphatic ketone.

11. The ink according to claim 10, wherein (E) the condensation product of urea and the aldehyde or (cyclo)aliphatic ketone comprises at least one $C_{1-10}$ aliphatic aldehyde, at least one $C_{5-12}$ (cyclo)aliphatic ketone, or mixtures thereof.

12. The ink according to claim 11, wherein the at least one (cyclo)aliphatic ketone is present and is cyclohexanone, methylcyclohexanone, or mixtures thereof.

13. The ink according to claim 11, wherein (E) the condensation product of urea and the aldehyde or (cyclo)aliphatic ketone comprises a $C_{1-5}$ aliphatic aldehyde.

14. The ink according to claim 10, wherein (E) the condensation product of urea and the aldehyde or (cyclo)aliphatic ketone is present in an amount of from about 5 wt % to about 40 wt % based on the total weight of (C), (D), and (E).

15. The ink according to claim 10, wherein (C) the ethylene acid copolymer is an ethylene-co-acrylic acid polymer and/or an ethylene-co-methacrylic acid polymer and comprises acrylic and/or methacrylic acid monomers in an amount comprised between about 15 wt % and about 20 wt % based on the total weight of the copolymer.

16. The ink according to claim 15, wherein (C) the ethylene acid copolymer is combined with an additional polymer selected from the group consisting of poly(meth)acrylic acid, ethylene/(meth)acrylic acid/(meth)acrylic acid $C_{1-20}$ alkyl ester terpolymers, (meth)acrylic acid/(meth)acrylic acid $C_{1-20}$ alkyl ester copolymers, ethylene-acrylic acid ionomers, and mixtures thereof.

17. A method of making the liquid electrophotographic ink of claim 10 comprising:
mixing
- (A) the liquid vehicle,
- (B) the at least one colorant,
- (C) the resin,
- (D) the ethylene/(meth)acrylic acid $C_{1-10}$ alkyl ester copolymer, and
- (E) the a condensation product of urea and the aldehyde or (cyclo)aliphatic ketone; and forming particles having a size of 0.01 to 50 microns by grinding (B), (C), (D), and (E).

18. The method according to claim 17, wherein (E) the condensation product of urea and the aldehyde or (cyclo)aliphatic ketone is present in an amount of from about 10 wt % to about 20 wt % based on the total weight of (C), (D), and (E).

19. A liquid electrophotographic printing system comprising:
a liquid electrophotographic printer; and
the liquid electrophotographic ink of claim 10 loaded in the liquid electrophotographic printer,
wherein the liquid electrophotographic ink comprises:
- (A) the liquid vehicle,
- (B) the at least one colorant,
- (C) the resin,
- (D) the ethylene/(meth)acrylic acid $C_{1-10}$ alkyl ester copolymer, and
- (E) the condensation product of urea and aldehyde or (cyclo)aliphatic ketone.

20. The liquid electrophotographic printing system according to claim 19, wherein:
- (C) the ethylene acid copolymer is an ethylene-co-acrylic acid polymer and/or an ethylene-co-methacrylic acid polymer and comprises acrylic and/or methacrylic acid monomers in an amount comprised between 15% and 20% by weight over the weight of the copolymer; and
- (E) the condensation product of urea and the aldehyde or (cyclo)aliphatic ketone comprises formaldehyde and (E) the condensation product of urea and the aldehyde or (cyclo)aliphatic ketone is present in the liquid electrophotographic ink in an amount of from about 10 wt % to about 20 wt % based on the total weight of (C), (D), and (E).

* * * * *